Feb. 18, 1969     D. A. GUNTHER     3,428,556
FILTRATION AND DISTILLATION PROCESS
Filed May 6, 1964
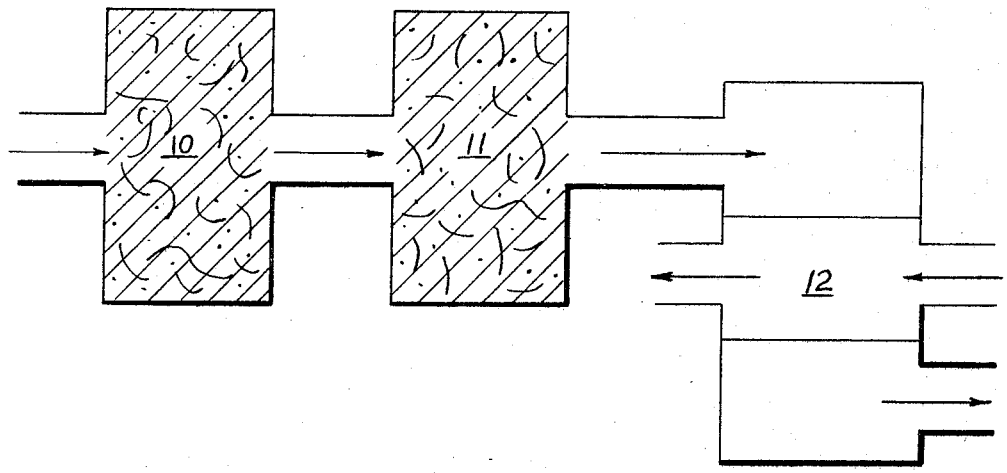
INVENTOR.
DONALD A. GUNTHER
By
Charles L. Lovenbach
attorney

United States Patent Office 3,428,556
Patented Feb. 18, 1969

3,428,556
FILTRATION AND DISTILLATION PROCESS
Donald A. Gunther, Erie, Pa., assignor to American Sterilizer Company, Erie, Pa., a corporation of Pennsylvania
Filed May 6, 1964, Ser. No. 365,461
U.S. Cl. 210—26     3 Claims
Int. Cl. B01d 3/00

This invention relates to processes for distillation and, more particularly, to processes of distillation of liquids containing ammonia.

Because of the many problems presented regarding ammonia in distilled water, a process has been developed for pretreating the raw feed water to a still so as to remove the ammonia and ammonia producing compounds and thus provide an ammonia free distillate. This ammonia is objectionable for many laboratory and clinical procedures. Also, the presence of the above compounds in feed water adversely affects performance of the still and the overall quality of the distillate.

The only solution to such problems in the past has been to pretreat the feed water with a mixed bed of deionizing resin; however, such pretreatment removes all ionizable material of which the objectional compounds may be only one minute fraction. The poor economy of such a method is obvious.

It has been discovered that by first removing the chlorine from the feed water, the ammonia can then be removed without removing certain unobjectionable materials.

The process disclosed herein employs a resin which absorbs only the objectionable compounds. It has been discovered that this resin is ineffective in removing such compounds from raw water supplies unless the chlorine in such supplies is first removed. The process disclosed uses activated charcoal as a pre-filter and chlorine adsorbent, followed by a bed of "Folin Permutit" (trademark) for ammonia, etc., removal. Both beds may be designed for the proper size according to the flow rate desired.

It is, accordingly, an object of the present invention to provide an improved process for distillation.

Another object of the invention is to provide a process for producing an ammonia free distillate.

With the above and other objects in view, the invention comprises the processes set forth in the specification and drawing and recited in the appended claims. The invention will be better understood from a reference to the drawing and detailed specification wherein:

The figure of drawing is a diagram of a process according to the invention.

An example of the process according to the invention is an apparatus indicated in the drawing utilizing a charcoal filter 10 in series with a Permutit filter 11 followed by a still 12.

The charcoal filter may be any well known design of charcoal filter which will be effective in removing chlorine. These filters are well known to persons skilled in the art.

The filter 11 will contain a resin which is capable of removing ammonia when no chlorine is present in the water but will not remove ammonia when chlorine is present. Examples of this resin are:

EXAMPLE I

Charcoal filter: "Folin Permutit" filter—still.

EXAMPLE II

Charcoal filter: weak acid cation exchange filter—still.

EXAMPLE III

Sodium thiosulfate or other reducing agent: "Permutit" filter—still.

EXAMPLE IV

Sodium thiosulfate or other reducing agent in filter: weak acid cation exchange filter—still.

By utilizing the charcoal filter in series with the filter 11 prior to the still 12, it has been discovered that the ammonia which is objectionable can be removed and certain unobjectionable materials need not be removed.

The foregoing specification sets forth the invention in its preferred practical forms but the process disclosed is capable of modification within a range of equivalents without departing from the invention which is to be understood is broadly novel as is commensurate with the appended claims.

The embodiments of the invention in which an exclusive property or privilege is claimed are defined as follows:

1. A process of distillation comprising
providing a source of liquid to be distilled,
passing said liquid through a filter capable of removing chlorine from said liquid,
then passing said liquid through a filter capable of removing ammonia only,
and then distilling said liquid.

2. A process of distillation comprising
providing a source of liquid to be distilled,
passing said liquid through a charcoal filter,
then passing said liquid through a weak acid cation exchanger,
and then distilling said liquid.

3. A process of distillation comprising
providing a source of liquid to be distilled,
passing said liquid through a charcoal filter,
then passing said liquid through a filter for removing ammonia,
and then distilling said liquid.

References Cited

UNITED STATES PATENTS

| | | | |
|---|---|---|---|
| 2,595,290 | 5/1952 | Quinn | 210—39 |
| 2,703,312 | 3/1955 | Hann et al. | 210—63 |
| 3,056,651 | 10/1962 | McIlhenny et al. | 203—10 |
| 3,127,243 | 3/1964 | Konikoff | 210—63 |
| 3,256,159 | 6/1966 | Salzer | 202—178 |
| 3,268,441 | 8/1966 | Lindstrom | 210—39 |

REUBEN FRIEDMAN, *Primary Examiner.*

F. A. SPEAR, JR., *Assistant Examiner.*

U.S. Cl. X.R.

202—176; 210—37, 38, 39, 152, 259